March 2, 1971 B. T. COLE ET AL 3,566,677
METHOD AND APPARATUS FOR MONITORING CONTENT
OF FLOWING STREAMS
Filed June 26, 1969

INVENTORS.
Benjamin T. Cole
BY Richard H. Stevens

ATTORNEY.

3,566,677
METHOD AND APPARATUS FOR MONITORING CONTENT OF FLOWING STREAMS
Benjamin T. Cole, Columbus, S.C., and Richard H. Stevens, Oak Ridge, Tenn., assignors to the United States of America as represented by the United States Atomic Energy Commission
Filed June 26, 1969, Ser. No. 836,729
Int. Cl. G01n 31/08
U.S. Cl. 73—61.3                    10 Claims

ABSTRACT OF THE DISCLOSURE

An improved method and apparatus for monitoring a liquid stream for high-boiling components dissolved or suspended therein. The stream is directed across a space defined by parallel horizontal extending surfaces to bridge the surfaces as a dynamic, flat-faced drop held therebetween by surface tension. Outflow from the drop is directed as a film down a drainage member to drip from its tip. A conveyor comprising spaced-apart groups of interconnected loops is passed through the drop to capture samples thereof in the conveyor loops, after which the loaded conveyor is passed through a heated zone to remove the liquid and any low-boiling components therein. The conveyor then is passed through a second heated zone to gasify any residue on the conveyor. The gasified residue is montored with a gas chromatography mass detector.

BACKGROUND OF THE INVENTION

This invention was made in the course of, or under, a contract with the U.S. Atomic Energy Commission.

The present invention relates generally to methods and apparatus for the detection or measurement of materials dissolved or suspended in liquid streams.

The invention is useful for making determinations on a batch basis, but it has special utility for the continuous monitoring of liquid streams. It can, for example, be used advantageously to monitor effluent streams from liquid chromatographs or sample streams derived from natural waters.

In the analysis of liquid streams including a carrier liquid and one or more high-boiling components dissolved or suspended therein, it is common practice to deposit a sample of the stream on a conveyor. The sample may comprise all or a part of the stream. The sample-loaded conveyor is moved into a heated zone where the carrier liquid and any low-boiling components are removed, leaving any high boiling components therein on the conveyor as a residue. The conveyor subsequently is moved into the flame of a flame ionization detector, where the residue is oxidized to the gas phase, producing a signal in the detector ouput indicative of the presence of any high-boiling component originally contained in the stream. Alternatively, the residue-carrying conveyor is moved into a second heated zone where at least a part of the residue is converted to the gas phase by volatilization or pyrolysis, the gas so produced being monitored by any suitable mass detector for indicating the presence of any high-boiling components originally contained in the stream. The output from the detector usually is connected to a recorder.

In those instances where it is desired to measure the quantity of a high-boiling component dissolved or suspended in the liquid stream, it is common practice to deposit on the conveyor a sample which as nearly as possible represents an aliquot portion of the original liquid stream, so that the output signal from the detector can be related not only to the presence but to the quantity and time of passage of such components in the stream.

In systems of the kind described, the conveyor often comprises a metallic wire or chain, usually in the form of an endless loop. A typical chain conveyor consists entirely of generally circular loops linked one to another. Wire conveyors typically consist of uncoiled wire or wire wound to form a continuous helix. The conveyor usually is loaded with samples of the liquid of interest by passing the conveyor just under the tip of a dispenser which drips the liquid onto the conveyor or forms a suspended drop of liquid through which the conveyor is passed.

Prior-art systems utilizing conveyors and sample-dispensers of the kinds just referred to are subject to serious limitations which are reflected in what is often an intolerable amont of backgrond noise in the detector output. As a result, signals corresponding to components contained in the liquid carrier are totally obscured or broadened to the point where they cannot be identified.

Perhaps the major cause of noise in systems of the type described is uneven distribution of the deposited liquid sample along the conveyor. Uneven distribution, in turn, is due to a considerable extent to shortcomings of the prior-art sample dispensers. For example, one class of dispensers forms the feed liquid into a hanging drop, through which the conveyor is passed. The exit surface of the drop is curved, with the result that any horizontal or vertical movement of the conveyor changes the angle at which the conveyor leaves the drop; because of surface-tension effects, this changes the amount of liquid loaded.

Uneven distribution of the sample also occurs if the feed from a drip-type dispenser exceeds the capacity of the conveyor, since the excess liquid hangs from the dispenser or conveyor in the form of a drop which gradually builds to drip-volume. As the drop elongates, surface tension causes a progressive reduction in the liquid load per unit length of the conveyor, producing a saw-tooth pattern in the detector output. This "drip-off" effect also is present in prior-art suspended-drop dispensers where the feed liquid is flowed down a vertical surface to bridge an open-bottomed keyhole-shaped slot through which the conveyor is passed.

The conveyor, too, can contribute to noise in the detector output by promoting uneven distribution of the deposited sample. For example, chain-conveyors of the kind described generate noise because they are subject to "run-along"—a term referring to diffusion of the solute and mass transfer of the liquid between linked and liquid-filled chain loops. Where the sample is a solution containing a solute, run-along results in a variable net movement of the solute toward the above-mentioned heated zone where the liquid carrier is removed. Thus, because of run-along the samples are not truly representative. One objectionable result of run-along is broadening of the peak width in the detector output signal. Run-along also is undesirable because it causes the detector output to be a complex function of the residence-time of the chain in the carrier-removal zone and the degree of tilt of the conveyor from the horizontal. In the absence of run-along, the function would be essentially linear.

SUMMARY OF THE INVENTION

It is a general object of this invention to provide a method and an apparatus for the monitoring of a liquid stream to indicate the presence or the order of magnitude of one or more high-boiling components dissolved or suspended therein.

It is another object of the invention to provide a method and an apparatus for monitoring a liquid stream containing material in solution or suspension for utilization with a conventional gas chromatography mass detector responsive to said material, the output from the detector being characterized by a low noise level.

The objects of this invention are realized by providing a monitoring system wherein the liquid stream of interest is directed across parallel, horizontally extending surfaces wettable by said liquid to bridge the surfaces as a dynamic drop maintained therebetween by surface tension. The surfaces are contoured to ensure that the drop is formed with an essentially flat face for egress of a conveyor which captures samples of the drop. Outflow from the drop is directed as a film down the exterior of a drainage member wettable by said liquid and having a tip from which the outflow drips. The film flow down the drainage member isolates the drop from the drip-off point, thus permitting the drop to have an essentially constant geometry.

The conveyor includes spaced-apart groups of interconnected links adapted to retain portions of the above-mentioned drop. The conveyor, whose design minimizes uneven distribution of liquid therealong, is passed through a heated zone for removing only the low-boiling portions of the sample, and then through a heated zone for gasifying any high-boiling residue on the conveyor. The gasified residue is monitored with a gas chromatography mass detector.

Other objects of the invention will become apparent from an examination of the following description and the appended drawings.

DETAILED DESCRIPTION

In the following paragraphs the illustrative form of the invention shown in FIG. 1 will be described generally. Those components of special design then will be described in more detail.

Figure 1:
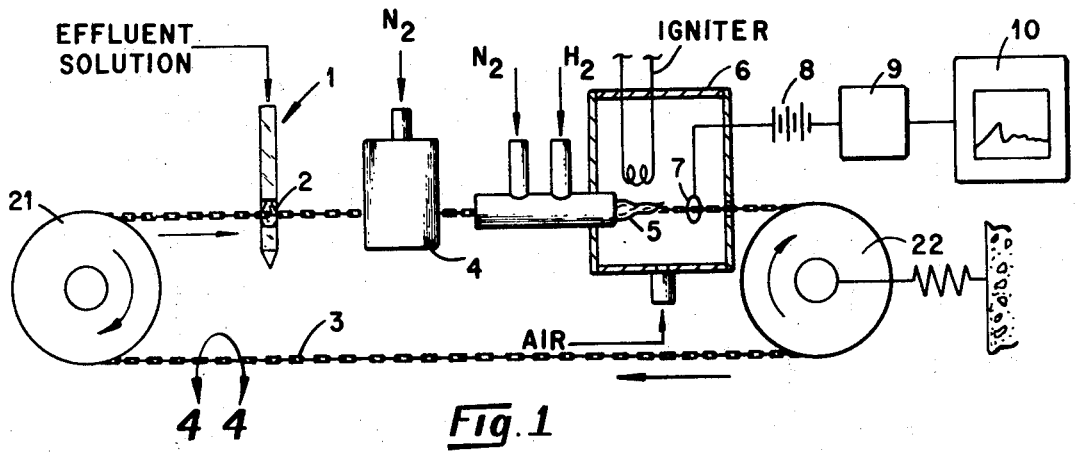
FIG. 1 is a diagrammatic representation of an illustrative form of apparatus for practicing the present invention.

In the system shown in FIG. 1, a drop-forming assembly 1 is shown as receiving an effluent solution comprising carrier liquid containing components dissolved or suspended therein. As shown, the assembly 1 forms the solution into a supported drop 2. A sample conveyor 3 in the form of an endless loop is mounted on a drive pulley 21 and an idler pulley 22 to be driven continuously through the drop 2 in the direction shown. Passage of the conveyor through the drop loads the former with portions of the drop. The loaded conveyor then is moved through a zone 4 heated to a comparatively low temperature to volatilize the carrier liquid, leaving the components therein as a residue on the conveyor. As indicated, the zone 4 preferably is swept with an inactive gas to remove the volatilized carrier.

The residue-carrying conveyor is moved from zone 4 through a zone 5 maintained at a temperature effective to convert all or a portion of the residue to the gas phase. In FIG. 1, zone 5 is represented as the flame of a conventional hydrogen-flame ionization detector 6 of the coaxial flame jet assembly type. The collector 7 of the detector is connected to a conventional output circuit including a D.C. voltage supply 8, an electrometer 9, and a strip recorder 10. The recorded signal is indicative not only of the presence but of the magnitude of components originally present in the solution fed to the drop-former 1.

Alternatively, as taught in U.S. Patent 3,128,619, zone 5 may comprise a furnace for gasifying the residue, and the detector 6 may comprise any suitable gas chromatography mass detector responsive to the gasified residue—such as a Katharometer, an argon ionization detector, a gas density balance, and a flame ionization detector.

Figure 3:
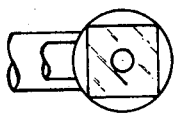
FIG. 3 is a sectional view taken along plane 3—3 of FIG. 2.
Figure 2:
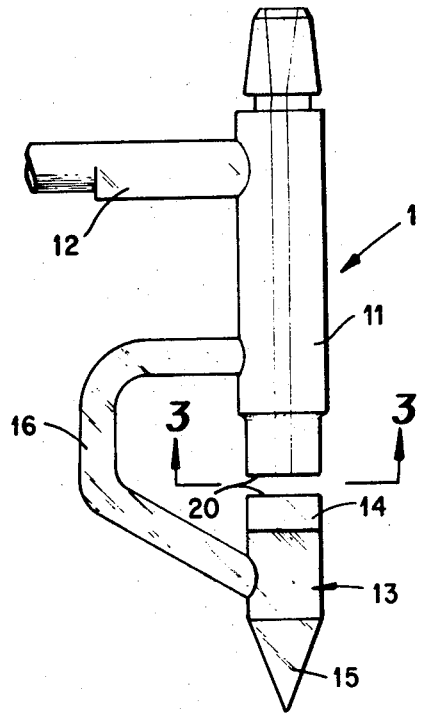
FIG. 2 is a side elevation of an improved drop-former incorporated in the apparatus shown in FIG. 1.

Referring to FIGS. 2 and 3, the drop-former 1 is designed especially to overcome the aforementioned defects of sample-dispensers of the prior art. In the preferred form illustrated in FIG. 2, the drop-former comprises a rigid glass assembly including a vertically oriented tube 11 whose upper end is tapered for leak-tight connection to a conical Luer-type sleeve (not shown) connected to a source of liquid containing dissolved or suspended components. (The bore in the upper end of the tube 11 is cone-shaped for insertion of tubing, if this is preferred.) As shown in FIG. 3, the lower end portion of the tube 11 is of square cross section. The tube 11 is provided with a laterally extending arm 12 for mounting the assembly in a fixed position.

Mounted just below tube 11 is a vertically oriented post 13 whose upper end portion 14 is of the same size and shape as the lower end of tube 11. The portion 14 is oriented so that its flat lateral faces are coplanar with corresponding faces of tube 11. The lower portion 15 of post 13 is of conical shape, tapering to a point. The confronting faces of tube 11 and post 13 are spaced by a selected small gap and are parallel. Post 13 is supported by an arm 16 joining medial portions of post 13 and tube 11.

The spacing between the confronting faces of tube 11 and post 13 is pre-selected empirically so that the feed liquid flowing through tube 11 will bridge these faces, forming a volume of flowing liquid therebetween which is held in position by surface tension. For convenience this volume will be referred to herein as a "drop." The liquid outflow from the drop flows down the exterior of post 13 as a film and drips from tip 15.

The assembly 1 overcomes the above-mentioned limitations of prior-art dispensers by forming a drop which has a preferred and essentially constant geometry. The drop is dynamic—that is, thert is a continuous flow across the gap between tube 11 and post 13 to ensure that the drop is a representative portion of the feed stream—but the drop is virtually unaffected by the above-mentioned surface-tension effects of drip-off because the film flow down the post 13 isolates the drop from the tip 15 where drip-off takes place. The drop bridging tube 11 and post 13 also have a preferred geometry because when isolated from the drip-off point, the drop assumes the shape of the surfaces defining the gap. Thus, the drop surfaces are essentially rectangular, providing a flat exit surface for the conveyor. As a result, conveyor sway and tilt produce little change in the angle at which the conveyor leaves the film and have little effect on conveyor loading.

Figure 4:
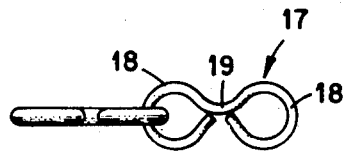
FIGS. 4 and 5 are fragmentary pictorial views of an improved sample-conveyor incorporated on the apparatus shown in FIG. 1.

Referring to FIG. 4, the conveyor 3 is of a special design essentially eliminating the above-mentioned run-along effect characteristic of chain conveyors of the prior art. The improved conveyor, which preferably is composed of a substantially inert metallic material in the form of a wire or sheathed cable, comprises a series of interlocking segments 17. Each segment comprises spaced-apart looped end portions 18 connected by an unlooped medial portion 19. Such segments may be formed easily by bending. The looped portions 18 are provided as carriers for liquid deposited therein when the conveyor is driven through the drop of liquid formed by the assembly 1. Run-along is eliminated with this type of conveyor because the film of liquid deposited on the medial portions by the drop-former 1 rapidly evaporates, leaving the loaded end loops 18 isolated from each other (with respect to flow) by the dry medial portions 19.

An improved monitoring system of the kind shown in FIG. 1 was fabricated by modifying a commercial monitor, the Barber-Colman Liquid Chromatography Monitor, Model 5400. Before modification, this monitor was schematically identical to the arrangements shown in FIG. 1, with two exceptions: (a) the Model 5400 Monitor was designed for use with a vertically oriented sample-dispensing tube having a discharge tip 1/32" in internal diameter positioned about 1/32" above the conveyor; and (b) the Model 5400 conveyor was a continuous platinum alloy chain composed of identical loops of the kind illustrated in FIG. 6. The commercial monitor was modified by replacing its liquid dispenser with the drop-forming assembly shown in FIG. 2, and by replacing its conveyor with a conveyor composed of segments of the design shown in FIG. 4.

The improved drop-forming assembly 1 installed in the Model 5400 Monitor was composed of Pyrex glass. The bore through the tube 11 was approximately one inch long and 0.040" in diameter. The confronting surfaces of the tube 11 and the post 13 were each 0.2" square, as were the lateral faces of both the lower end portion of tube 11 and the upper end portion of post 13. The spacing between the confronting surfaces of the tube 11 and post 13 was 0.080". The upper and lower lateral faces whose lower edges would define the chain-exit face of the drop were made coplanar within 0.020". The overall length of the post 13 was 3/4", and the length of the conical tip 15 was 3/8".

The improved conveyor 3 installed in the Model 5400 Monitor was a 25" continuous loop formed of 0.0105"-diameter, 90% platinum-10% iridium with a 10% 22-karat white gold core to permit brazing. The conveyor segments, designed as shown in FIG. 4, had an over-all length of 0.154"; the end loops 18 were somewhat oval, having a major diameter of about 0.044" and a minor diameter of about 0.034". The end loops were formed by bending the wire about a suitably sized pin. After various segments were interlocked, the loops were brazed closed, using the gold core as a filler metal. The medial section 19 was slightly curved and was about 0.025" long.

The resulting modified monitor, corresponding to the system shown in FIG. 1, was used to monitor various solutions. The resulting data were compared with those obtained previously when solutions of the same kind had been analyzed under the same operating conditions with the unmodified Model 5400 Monitor. The system corresponding to that of FIG. 1 had significantly less output noise under nearly all of the conditions tested.

For example, both monitors were used with a feed liquid consisting of 50 μg./ml. bovine serum albumin (BSA) in water. This solution was supplied to the monitors by a standard pump adapted to deliver the solution at various uniform rates. Both monitors were operated under the same conditions—e.g., an evaporation-chamber temperature of about 230° C., a chain speed of 7 cm./min., a detector collector voltage of +240 volts, and an electrometer time constant of 30 seconds. Expressing the noise in the output signal as the amplitude of the recorded noise envelope divided by the average signal level, the modified arrangement had a noise content ranging from 10 to 11 percent. The corresponding noise levels for the unmodified arrangement ranged from 12 to 37 percent for flows ranging from 0.3 to 0.023 ml./min., respectively. At a flow rate only slightly in excess of the conveyor's carrying capacity (0.015 ml./min.), a slow dripoff occurred, and under this condition a noise content of 29 percent for the modified arrangement compared with a noise content of 92 percent for the unmodified instrument. In the latter instance, the signal level from the unmodified unit was unreadable because of the large noise excursions. In the modified arrangement the output signal was a linear function of the conveyor speed, and ramping in the output was reduced significantly.

Figure 6:
FIG. 6 is a fragmentary pictorial view of a sample conveyor of the prior art.

The improved conveyor of FIG. 4 offers advantages over the design shown in FIG. 6, even when used with a prior-art drip-type dispenser. For example, the unmodified Model 5400 Monitor was operated at sample flows ranging from 0.015 to 0.3 ml./min., BSA in water. The improved conveyor (FIG. 4) then was substituted for the Model 5400 conveyor (FIG. 6). This substitution reduced the noise level in the output by a factor of two. Because use of the improved conveyor eliminated run-along, thus reducing line broadening, narrow-peak distributions of solutes in the feed stream were more readily identified in the output. Also, the improved conveyor was found to acquire a more uniform liquid load over a range of flows. The output signal was linear with chain speed only when the improved conveyor was used.

Other tests have demonstrated that the improved drop-forming assembly 1 can improve monitor operation when used with a prior-art conveyor of the kind shown in FIG. 6. In a series of tests conducted with this arrangement an aqueous solution (BSA in water) was fed to the monitor at various rates. At flow rates below about 0.75 ml./min., use of the improved drop-former reduced the output noise by as much as a factor of two by eliminating the effect of drip-off.

Referring to the drop-forming assembly 1, it is essential that the confronting surfaces of the tube 11 and post 13 be composed of a material wettable by the liquid feed. They should also be as nearly parallel as possible. It is not essential that these surfaces be square, but in order to obtain an essentially flat chain-exit surface for the drop it is essential that the pair of edges (20, FIG. 2) defining the exit surface be substantially straight and that they lie in substantially the same vertical plane. The spacing required for formation of a dynamic drop held between the confronting surfaces by surface tension may vary for different solutions but can be determined easily by test. A spacing of 0.080" has been found suitable for BSA-in-water solutions and for various other soluble organic compounds dissolved in vaporizable buffers, such as aqueous ammonium acetate. The feed liquid need not be dispensed through the upper confronting surface, but if desired could be introduced through a passage provided in the lower confronting surface so as to bridge the surfaces and then drain down the post 13.

Figure 5:
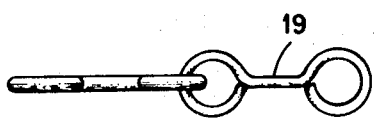

Referring to the improved conveyor 3, the length of the medial portion 19 is not highly critical; with most liquid samples a length of only about 0.020" is sufficient to isolate the looped ends with respect to flow. The medial portion may be of various configurations; good results have been obtained with this portion slightly curved (FIG. 4) or substantially straight (FIG. 5). The conveyor 3 may be composed of various heat-resistant, substantially inert materials, such as platinum-iridium, Inconel-X, and Chromel.

The remainder of the components of the improved system (FIG. 1) may be of conventional design. As explained above, they may, if desired, be identical in design to the corresponding components of the Barber-Colman Model 5400 Monitor. The flame ionization detector need not be of the hydrogen type but may, for example, employ a carbon monoxide flame. As mentioned, the heated zone 5 may be a standard evaporation (pyrolysis) furnace communicating with any suitable gas chromatography detector.

The improved system illustrated in FIG. 1 has been used successfully not only with BSA-in-water solutions, but with BSA in ammonium acetate and ammonium bicarbonate buffer solutions, and with high-boiling organic compounds, such as chrysene and lineolic acid, dissolved in carbon tetrachloride or heptane.

Under the conditions of 100% sample pickup and a flow of 0.026 ml./min. to the improved system of FIG. 1, a constant sensivity of 0.0028 coulomb/g. of carbon was obtained over a BSA concentration range of 50 to 1000 μgm./ml. in water.

What is claimed is:

1. A monitor for a liquid stream including a carrier liquid and a component dissolved or suspended therein comprising, in combination, a drop-forming assembly including two vertically spaced horizontally extending surfaces wettable by said stream, one of said surfaces communicating with a capillary connected to receive said stream and discharge the same onto the other of said surfaces, the spacing between said surfaces being of a dimension sufficient for said stream to bridge said surfaces as a dynamic drop maintained therebetween by surface tension, a conveyor movable through said drop to transfer portions thereof to said conveyor, a carrier-removal chamber traversed by said conveyor and maintained at a temperature selected to remove said carrier liquid and leave said component on said conveyor as a residue, means for heating said conveyor to gasify said residue, and means for monitoring said gasified residue to generate an output signal indicative of the presence of said component in said stream.

2. The combination of claim 1 wherein the lower of said surfaces comprises the top of a drainage member wettable by said liquid and contoured to promote film flow thereof.

3. The combination of claim 1 wherein said conveyor comprises a series of coupled segments, each segment including a medial portion and looped end portions joined thereby.

4. The combination of claim 3 wherein said medial portion is in the form of a shallow U.

5. The combination of claim 3 wherein said medial portion is substantially straight.

6. The combination of claim 1 wherein said means for heating said conveyor to gasify said residue comprises a furnace communicating with a gas chromatography mass detector.

7. The combination of claim 1 wherein said means for heating said conveyor to gasify said residue is a flame and said means for monitoring said gasified residue is an electrical circuit for generating an output signal proportional to said gasified residue.

8. The combination of claim 1 wherein said spacing is in the range of $\frac{1}{32}$" to $\frac{3}{16}$".

9. The combination of claim 1 wherein said conveyor is an endless loop composed of metallic material.

10. The method of monitoring a liquid stream including a carrier liquid and a component dissolved or suspended therein which method comprises forming said stream into a bottom-supported dynamic drop maintained in a substantially constant configuration by surface tension, traversing said drop with a conveyor adapted to remove portions thereof, traversing said conveyor through a heated zone to remove said liquid carrier and leave said component as a residue on said conveyor, heating the residue-carrying conveyor to gasify said residue; and exposing a gas chromatography mass detector to the gasified residue to generate a signal denoting the presence of said component.

References Cited

UNITED STATES PATENTS

| | | | |
|---|---|---|---|
| 2,826,076 | 3/1958 | Boretz et al. | 73—53X |
| 3,128,619 | 4/1964 | Lieberman | 73—23.1 |
| 3,138,015 | 6/1964 | Avery | 73—61 |
| 3,252,763 | 5/1966 | Durrum et al. | 141—130X |

LOUIS R. PRINCE, Primary Examiner

J. W. ROSKOS, Assistant Examiner

U.S. Cl. X.R.

73—23.1, 61.1; 141—130; 222—420